A. BURTON.
FUMIGATOR FOR FRUIT PRODUCTS.
APPLICATION FILED JUNE 13, 1911.
1,017,647.
Patented Feb. 20, 1912.
2 SHEETS—SHEET 2.
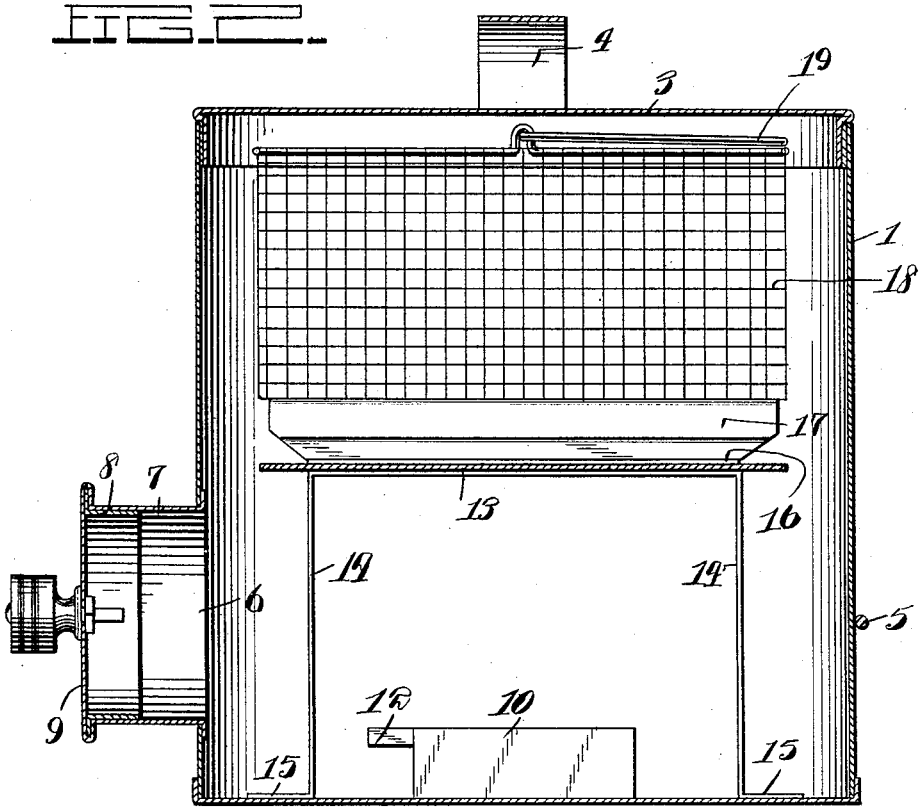
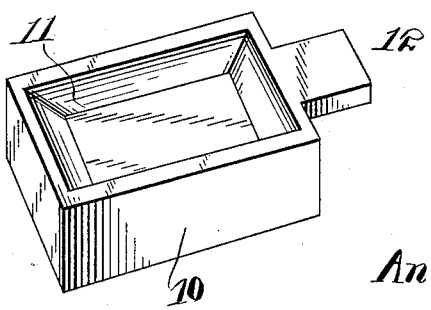
Inventor
Andrew Burton.
Witnesses

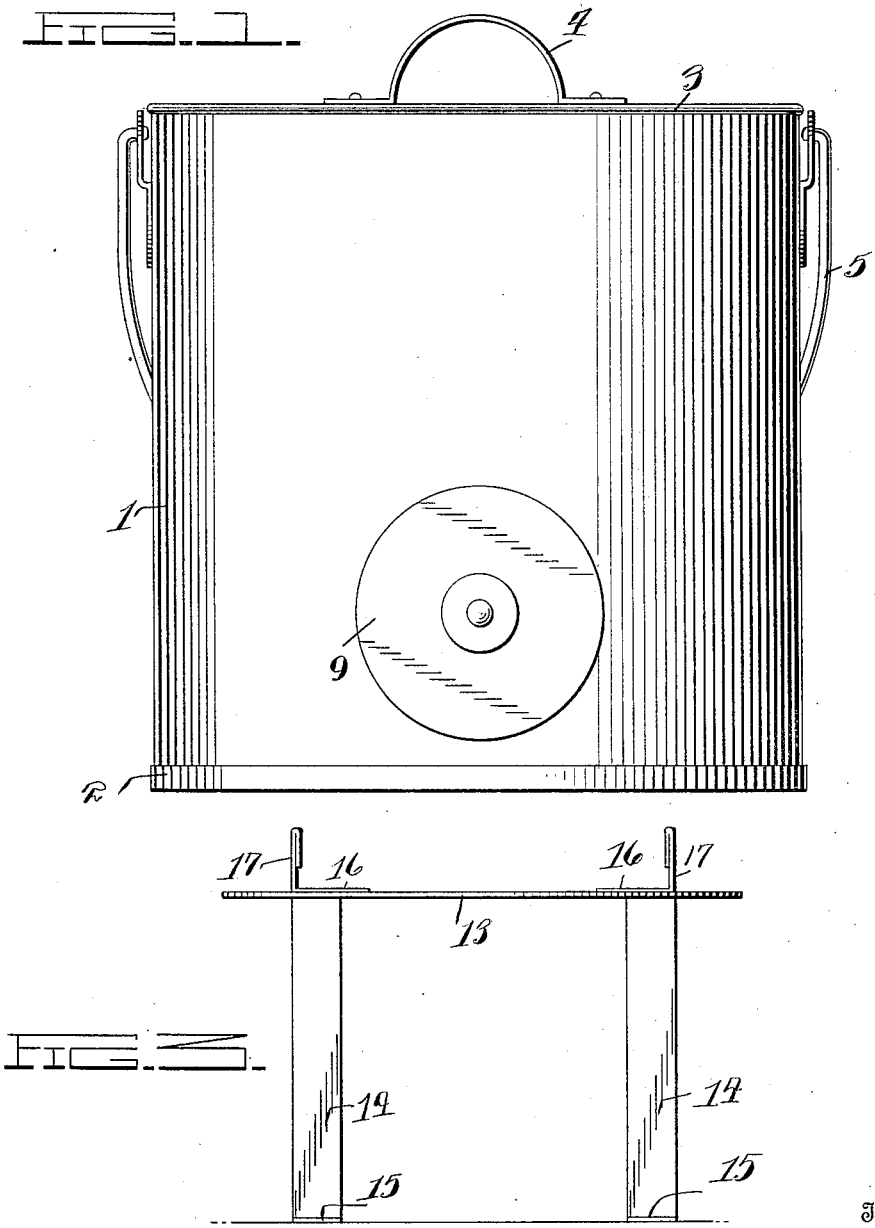

UNITED STATES PATENT OFFICE.

ANDREW BURTON, OF PERKINS, OKLAHOMA.

FUMIGATOR FOR FRUIT PRODUCTS.

1,017,647.  Specification of Letters Patent.  Patented Feb. 20, 1912.

Application filed June 13, 1911. Serial No. 632,936.

*To all whom it may concern:*

Be it known that I, ANDREW BURTON, a citizen of the United States, residing at Perkins, in the county of Payne, State of Oklahoma, have invented certain new and useful Improvements in Fumigators for Fruit Products; and I do hereby declare the following to be a full, clear, and exact description of the invention, such as will enable others skilled in the art to which it appertains to make and use the same.

My invention relates to new and useful improvements in fumigators for food products, and the object of my invention is to improve the construction and increase the efficiency of the above type of fumigators.

With these and other objects in view, my invention consists primarily of a casing having a closure, a receptacle seated in said casing for holding a smoke forming substance, a baffle plate supported within said casing and having upwardly extending flanges, and a foraminous receptacle seated upon said flanges and adapted to hold the food to be fumigated.

In the accompanying drawings which illustrate a preferred embodiment of my invention, Figure 1 is a front elevation. Fig. 2 is a central vertical section on the line 2—2 of Fig. 1 showing the parts in operative position. Fig. 3 is a detail perspective of the baffle member. Fig. 4 is a detail perspective of the receptacle in which the fumigant is burned.

Referring more specifically to the drawings, in which similar reference numerals designate corresponding parts throughout, 1 indicates the casing which is preferably constructed of sheet metal, cylindrical in shape and having a closed bottom 2 and a tightly fitting cover 3 provided with a handle 4 for removing the same, a bail 5 of the customary form is provided by means of which the fumigator may be readily moved from place to place. The lower portion of the casing is provided with a port 6 surrounding which is an annular, outwardly extending flange 7 adapted to engage with the flange 8 of a closure 9 whereby the port may be closed. This port is so proportioned that the fumigant holder 10 may be readily passed in and out of the casing through the port. As shown this fumigant holder or receptacle consists of a relatively heavy piece of metal, preferably cast iron, having its upper face dished as at 11 to receive the fumigant and having a handle 12.

Supported upon the bottom of the casing and spaced therefrom is a baffle member which as a whole is designated by the numeral 13. As best shown in Fig. 3 of the drawings this member consists of a circular plate of sheet metal somewhat less in diameter than the inner diameter of the casing. Secured upon opposite sides to the lower face of this plate are the U-shaped members 14 the sides of which form supporting legs, their free ends terminating in laterally directed feet 15 by which means the baffle member is steadily supported in the casing. Secured to the upper face of the plate are strips of sheet metal 16 which are bent upward longitudinally to form supporting flanges 17. Seated upon these flanges and thus held in spaced relation above the baffle member is a receptacle 18, preferably cylindrical in shape and formed of foraminous material, said receptacle being provided with a bail 19 by means of which it may be lowered into or raised from the casing.

In operation the baffle member is seated within the casing as shown in Fig. 2 and the receptacle 18 is filled with the fruit or other food which is to be fumigated and seated upon the baffle plate, when the cover 3 is closed. The fumigant holder 10 is then highly heated and passed into the receptacle through the port 6 and the sulfur or other smoke forming substance is placed upon the same and the closure 9 secured in place.

As will be readily understood the high temperature of the heavy casting upon which the fumigant is placed will cause the same to burn until completely consumed. The smoke or fumes, rising from the fumigant holder hits the bottom of the baffle and radiates therefrom and is free to pass back over the top face of the baffle member between it and the food holding receptacle as well as around the sides of the receptacle. By this means the fumes enter all of the openings of the foraminous food receptacle and completely permeate the food contained therein.

What I claim is:—

A fumigator for food products consisting of a vessel having a fumigant chamber in its base, a baffle disposed horizontally directly above the fumigant chamber centrally of the vessel and in spaced relation to the sides thereof, said baffle having supports upon its upper face, a foraminous receptacle disposed upon the supports in spaced relation to the baffle in position to form passages in connection with the baffle and its supports, which passages extend entirely across the baffle in position to conduct fumigant to all parts of the bottom of the receptacle, and a closure for the vessel.

In testimony whereof, I affix my signature, in presence of two witnesses.

ANDREW BURTON.

Witnesses:
W. T. SWINFORD,
W. L. HEYL.

Copies of this patent may be obtained for five cents each, by addressing the "Commissioner of Patents, Washington, D. C."